May 3, 1955

S. O. DORST 2,707,693

PROCESS FOR PRODUCING ELECTRICAL COILS

Filed July 21, 1950

INVENTOR
STANLEY O. DORST

BY Arthur G. Connolly his ATTORNEY

United States Patent Office 2,707,693
Patented May 3, 1955

2,707,693
PROCESS FOR PRODUCING ELECTRICAL COILS

Stanley O. Dorst, North Adams, Mass., assignor to Sprague Electric Company, North Adams, Mass., a corporation of Massachusetts Application July 21, 1950, Serial No. 175,110

2 Claims. (Cl. 154—80)

The present invention relates to electrically insulated elements and more particularly refers to new and improved types of coils, transformers, electric motors and the like.

Prior Patent No. 2,350,822, issued on June 6, 1944, to P. Robinson describes the preparation of fused coils for use in electromagnets, transformers and the like. In this patent the wire is provided with a co-deposit of a ceramic material and an elastomer. The insulator wire is wound into a coil and the adequate turns fused together into a compact mass by application of heat and pressure. The resulting coil is an integral stable assembly capable of use over a moderate temperature range, the range depending upon the nature of the elastomer, and under reasonable mechanical stress.

Recent developments in the resin field have contributed to the art dielectric materials such as polytetrahaloethylenes and silicones. These materials have satisfactory mechanical properties and are suitable for use at relatively high temperatures. If it is desired to produce an integral stable high temperature coil employing such resins, at least in part, as the dielectric insulation between the individual turns of the coil, the resin may be applied to the wire conductor by extrusion or other means. The insulated wire may then be wound into coil form and held in place by external pressure. Polytetrahaloethylene resins and the silicone rubbers are however characterized by thermoplastic flow, particularly at elevated temperature and under pressure. Thus, the resin coating on coil wires insulated wholly with either of these materials may flow sufficiently to permit short circuiting between turns, to a metal core, or otherwise, particularly when the wire is wound on forms having sharp corners, or relatively small radii. Use of an inorganic filler in the resin will not normally overcome this difficulty although some improvement may be achieved. Furthermore, polytetrafluoroethylene, for example, once applied in fused form to the conductor may not subsequently be bonded to adjacent conductors with any degree of success. It is further difficult, if not impossible, to impregnate the wound coil with a dielectric material having thermal stability comparable to polytetrafluoroethylene.

Thus there is a need for an integral, fused, high temperature coil assembly which can be readily produced and once in final physical form will not be subject to short circuiting between turns. It is an object of the present invention to supply a coil assembly that avoids the foregoing and related disadvantages. A further object is to produce a new and improved electrical coil assembly. A still further object is to produce a coalesced high temperature cylindrical coil. Additional objects will become apparent from the following description and claims.

These objects are attained in accordance with the present invention wherein there is produced an electrical coil comprising at least one conductor wound into adjacent turns and superimposed layers, an integral coating of particles of ceramic material on the conductor, said coating being covered with, and the interstices of said coil being substantially filled with, a solid dielectric material containing a major amount of a fused resin selected from the class of polymeric tetrahaloethylenes and silicones. By silicones is meant organo-substituted polysiloxanes in which the organic groups are bonded to silicon by carbon-to-silicon bonds.

In one of its preferred and limited embodiments the invention is concerned with an electrical coil comprising at least one conductor wound into adjacent turns and superimposed layers, an integral coating of particles of ceramic material on the conductor, said coating being covered with, and the interstices of said coil being substantially filled with, coalesced polytetrafluoroethylene resin.

The invention is also generally concerned with a process for producing electrical coils which comprises passing at least one conductor insulated with an integral layer of particles of ceramic material through a suspension of particles of dielectric material selected from the class of polymerized perhaloethylene and silicone rubbers, removing the suspending medium from the coating of said resin on said conductor, winding the conductor into the form of an electrical coil and heating said coil under pressure at a temperature sufficient to coalesce said resin particles together.

I have discovered novel means for producing extremely durable high temperature electrical coils by overcoming the disadvantages heretofore encountered with certain high temperature resin materials. I have found that if I apply a non-thermoplastic insulating underlay on a conductor, subsequently apply semi-coherent resin particles to the insulated conductor, immediately wind the so-called conductor into coil form and subject the assembly to a heat and pressure curing operation, I obtain a high temperature coil assembly which will withstand all conditions normally met in service. The resin coating should preferably be at least 0.3 mil in thickness.

The ceramic undercoating eliminates any possibility of short circuiting under extreme temperature and pressure conditions. This initial insulation may consist of the oxide of the conductor or an adherent coating of finely divided ceramic particles. Examples of the latter are fully described in U. S. Patent No. 2,421,652 granted June 3, 1947. The type of conductor employed may be copper, nickel-chromium alloy, nickel, nickel-plated copper, silver, etc.

The invention is particularly advantageous when the resin is a polymerized tetrahaloethylene or an elastomeric silicone. Preferred examples are polytetrafluoroethylene and silicone rubber such as the dimethyl polysiloxane described in U. S. Patent No. 2,460,795 granted February 1, 1949. These resins are advisably applied to the insulator conductor as particles of particle size between about 1 and about 500 microns. The application is generally from a suspension thereof in a non-solvent such as water, alcohol, trichloroethylene, etc. The deposition may be accomplished by simple dipping, or in the case of a porous ceramic underlay, by electrophoresis. Also, pastes of the resin and liquid mediums may be extruded onto the wire.

After application of the resin particles to the conductor, the coated conductor is subjected to a drying operation to remove any residual suspending medium. Thereafter the conductor is wound into the coil assembly, preferably under pressure. The completed assembly is subjected to heat and preferably to pressure to fuse or coalesce the resin particles together, and thereby integrate the coil assembly into a solid tough mass.

The invention will be found described with reference to the appended drawing in which Fig. 1 shows a simplified schematic arrangement for the coating and coil winding operation;

Figure 1:
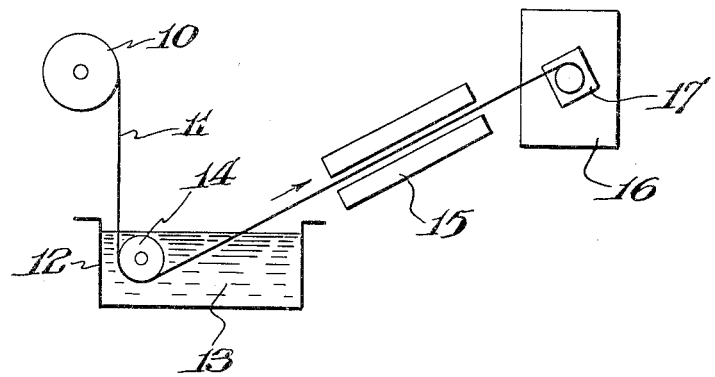

Referring more specifically to Fig. 1, 10 represents a spool from which conductor 11 is unwound into coating cell 12 which is filled with a suspension of resin particles 13. The incoming wire 11 is previously provided with a ceramic base coat as described in Patent No. 2,421,652 for example, and passes under reversing pulley 14 and out of the suspension 13 into drying oven 15. This oven which is generally maintained at a temperature between about 75° C. and about 200° C., and below the resin sintering temperature, is employed to remove the residual suspension medium from the insulation. The insulated wire 11 with its external resin coating is then wound onto coil form 17 in winding machine 16. It is often desirable to apply a pressure roller (not shown) during the winding to consolidate the resin particles and to substantially completely eliminate large air voids.

Figure 2:
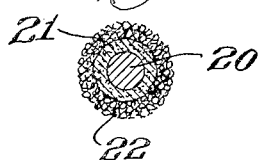
Fig. 2 shows a cross section of the conductor before final fusing.

Fig. 2 is a simplified cross section of the conductor 11 after it passes from drying oven 15. 20 represents the conductor with its non-thermoplastic coating 21. An outer coating of unfused resin particles 22 intimately surrounds coating 21.

Figure 3:
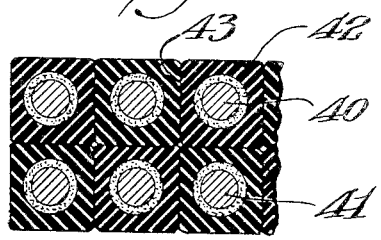
Fig. 3 shows a cross section detail of the cured resin coil assembly.

Fig. 3 shows a simplified cross section of a portion of the finished coil assembly in which conductors 40, 41, etc., are surrounded by fused or coalesced insulation 42. Boundary line 43 illustrates the location of the resin junction between individual wire insulations. This is however a fused bond.

Figure 4:
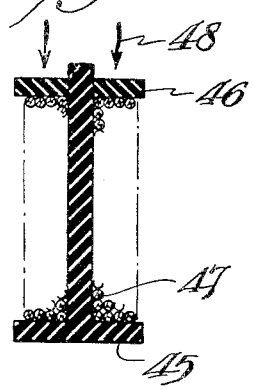
Fig. 4 shows a simplified cross section of the coil assembly and means for maintaining same under pressure.

Fig. 4 shows a simplified cross section of the coil assembly fusion apparatus. The coil assembly 47 is wound on core 45. One end of the winding abuts against movable washer 46. Pressure indicated at 48 is applied to the washer 46 and thus to coil 47 during the particle sintering operation. This operation is normally carried out at temperatures from about 200° C. to about 475° C., depending on the particular resin employed and the time of treatment. Although elastomeric silicones are preferred, other solid but fusible or sinterable linear, cyclized or partially cross-linked silicones can be used either by themselves or in mixtures with the elastomers.

In addition to the polytetrahaloethylene and silicone resins, the present invention is also applicable to another class of resins, e. g. those which are applied to the conductor in a linear, thermoplastic polymeric condition and subsequently cross-linked to produce tough, thermosetting resins. For example, a conductor may be coated, by electrophoresis, dipping or extrusion as previously described, with an essentially linear polymer containing cross-linking foci. After deposition at relatively low temperatures, and winding of the conductor into the form of a coil, the cross-linking may be effected by heat treatment of the coil in the manner described in connection with the sintering of polytetrahaloethylene resin particles, although in most instances the temperature is somewhat lower, e. g. on the order of 100 to about 200° C. Suitable polymers are made by polymerizing at low temperatures styrene, pentachlorostyrene, isobutylene, isoprene, butadiene, or the like with about 5 to 95% a polyfunctional monomer such as divinyl benzene. Cross-linked resins of this type are suitable for use with coils operating at temperatures not quite as high as the tetrahaloethylene and silicone resins.

Another way for providing the cross-linking foci is to include in the linear polymer substituent groups which will decompose at elevated temperatures to give rise to active cross-linking groups. For example, styrene can be polymerized with a minor amount of p-(alpha-hydroxy ethyl)-styrene to produce linear polymers. After deposition on the conductor, the resin may be heated to split off water from the hydroxyethyl group, converting it to the active vinyl group which then cross-links the linear polymer chains.

While the description of the invention has been particularly directed to wires and similar conductors, it is to be understood that it is also applicable to convolutely wound capacitors, high permeability magnetic cores and the like, which employ flexible, foils and sheets. If it is desired, for example to produce fused high temperature capacitors, two foils are passed through the coating apparatus as described in connection with Figure 1 and subsequently convolutely wound together. The wound unit is then heated to a temperature above the transition point of the resin, in the case of a top coating of polytetrahaloethylene resin, to fuse the resin particles together and produce a solid capacitor which no longer can be unwound. The combination of copper electrode foils with a layer of adherent ceramic particles and a top coating of polytetrafluoroethylene particles is a preferred example of the practice of the invention with regard to such assemblies. However, high permeability nickel alloy and similar metal foils may be likewise fabricated into compact and durable cores by treatment, for example, with magnesium oxide ceramic particles and then a top coating of partially cured silicone resin, the wound core being heated at 265° C. for about 30 minutes to complete the fusion.

This application is a continuation-in-part of copending application Serial Number 767,740, filed August 9, 1947.

As many apparently widely different embodiments of this invention may be made without departing from the spirit and scope hereof, it is to be understood that it is not limited to the specific embodiments thereof except as defined in the appended claims.

What is claimed is:

1. A process for producing electrical coils which comprises passing at least one conductor insulated with an integral coating of finely divided particles of ceramic material through a suspension of particles of a polymer of a tetrahaloethylene, removing the suspending medium from the coating of said polymer thus left on said conductor, winding the conductor into the form of an electrical coil and heating said coil under pressure at a temperature sufficient to fuse said polymer particles together.

2. A process for producing electrical coils which comprises passing at least one conductor insulated with an integral coating of finely divided particles of ceramic material through a suspension of particles of a polytetrafluoroethylene, removing the suspending medium from the coating of said polymer thus left on said conductor, winding the conductor into the form of an electrical coil and heating said coil under pressure at a temperature sufficient to fuse said polymer particles together.

References Cited in the file of this patent

UNITED STATES PATENTS

| Number | Name | Date |
|---|---|---|
| 2,116,318 | Miles, Jr. | May 3, 1938 |
| 2,352,974 | Rochow | July 4, 1944 |
| 2,387,759 | Jarvis | Oct. 30, 1945 |
| 2,421,652 | Robinson et al. | June 3, 1947 |
| 2,442,587 | Coggeshall | June 1, 1948 |
| 2,460,795 | Warrick | Feb. 1, 1949 |
| 2,489,867 | D'Orio | Nov. 29, 1949 |
| 2,495,630 | Dorst | Jan. 24, 1950 |
| 2,520,173 | Sanders | Aug. 29, 1950 |
| 2,553,362 | Dannenberg | May 15, 1951 |